G. P. BRAND.
TRANSMISSION MECHANISM FOR AUTOMATIC MUSICAL INSTRUMENTS.
APPLICATION FILED APR. 13, 1915. RENEWED MAR. 28, 1917.
1,232,199.
Patented July 3, 1917.
3 SHEETS—SHEET 1.
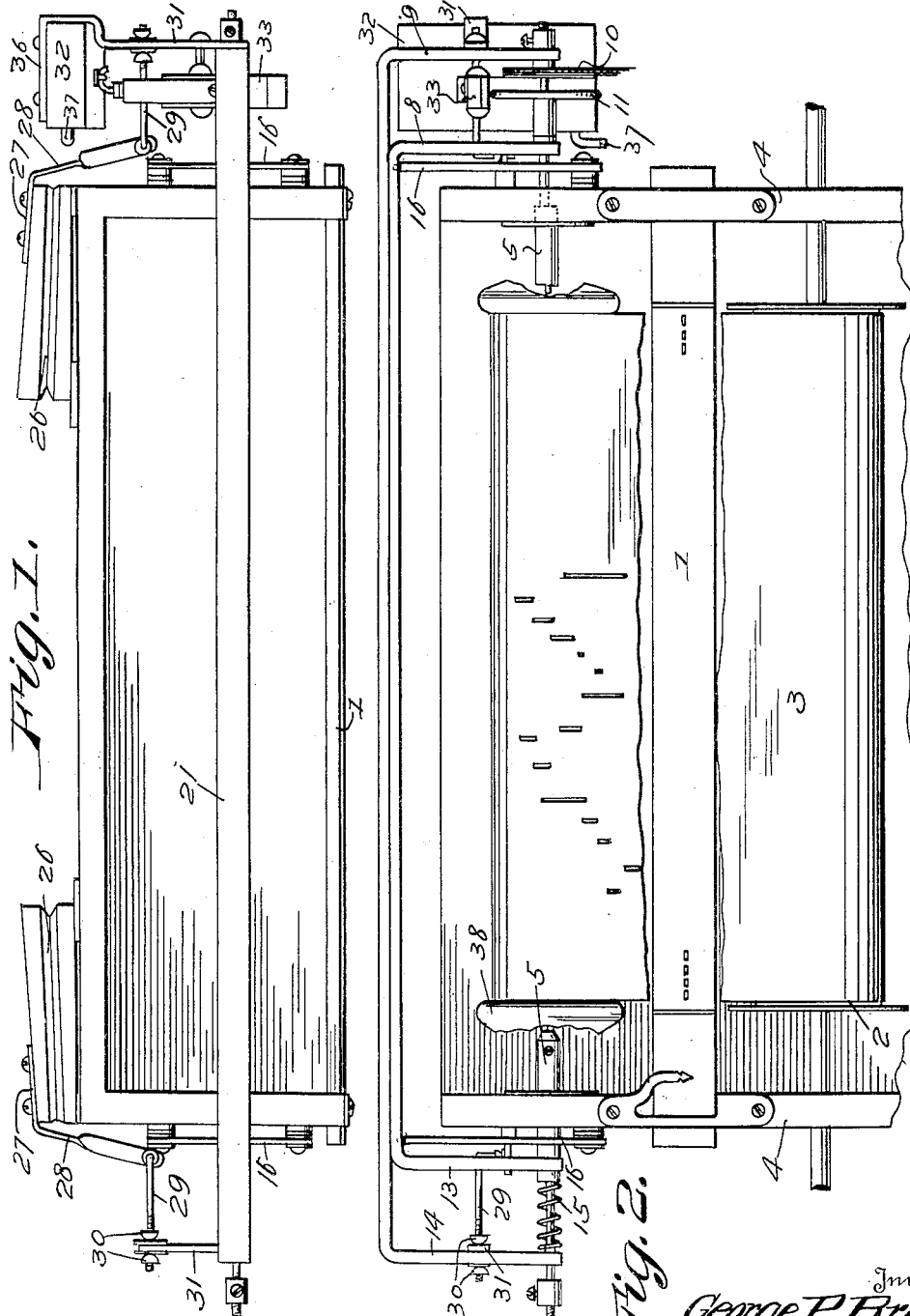
Witness
C. W. B. Brown
Inventor
George P. Brand,
By E. W. Bond
Attorney

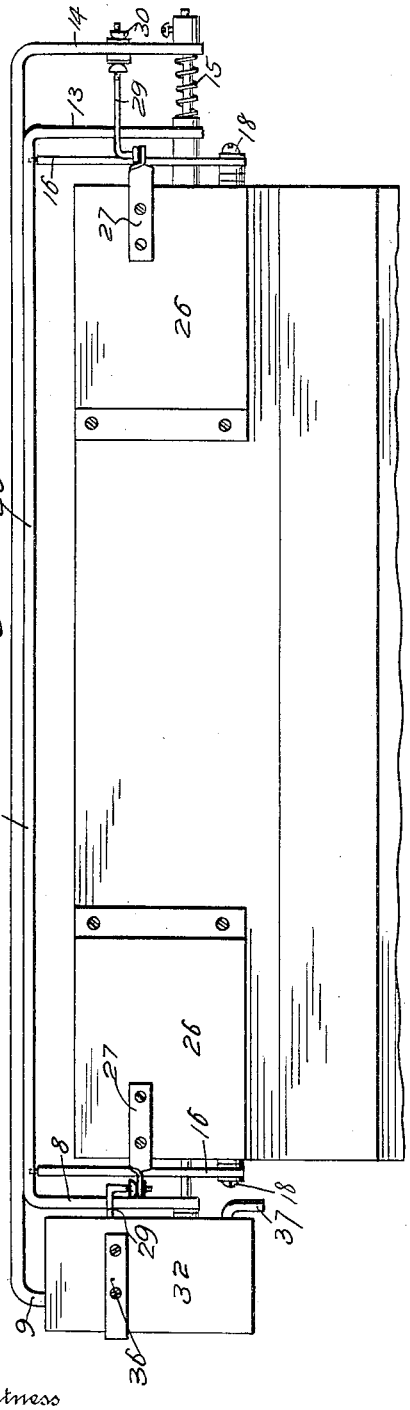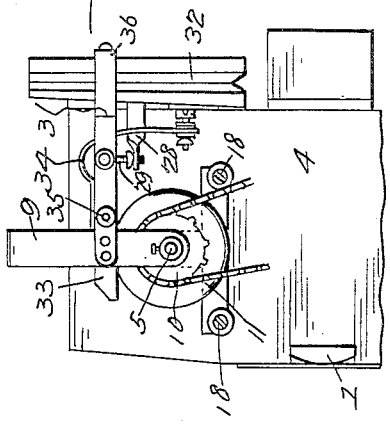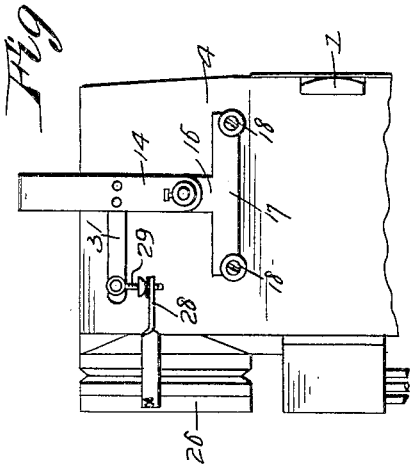

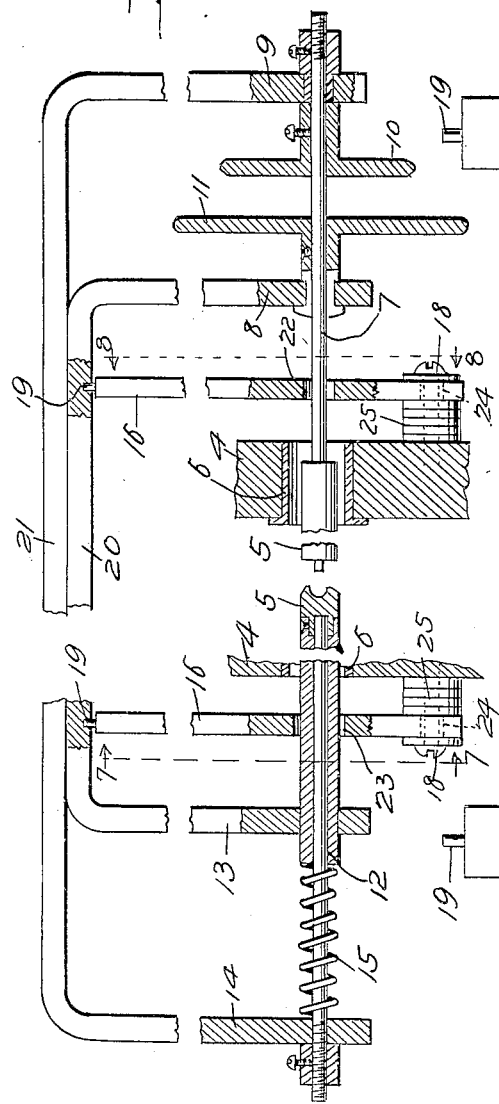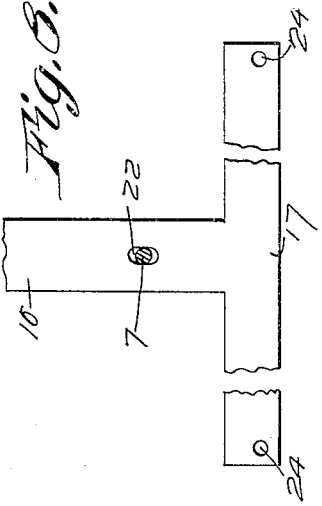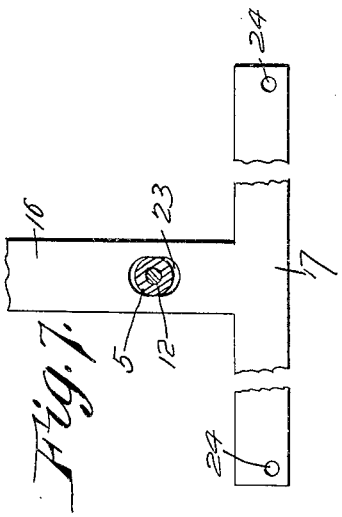

UNITED STATES PATENT OFFICE.

GEORGE P. BRAND, OF NEW YORK, N. Y.

TRANSMISSION MECHANISM FOR AUTOMATIC MUSICAL INSTRUMENTS.

1,232,199.      Specification of Letters Patent.      Patented July 3, 1917.

Application filed April 13, 1915, Serial No. 21,168. Renewed March 28, 1917. Serial No. 158,117.

*To all whom it may concern:*

Be it known that I, GEORGE P. BRAND, a citizen of the United States, residing at New York, in the county of New York and State of New York, have invented certain new and useful Improvements in Transmission Mechanism for Automatic Musical Instruments, of which the following is a specification.

This invention relates to certain new and useful improvements in automatic musical instruments and analogous devices and pertains more particularly to what I term a "floating transmission."

The present invention has for its objects among others to provide a novel form of transmission supporting the music spool and mounted for movement laterally in either direction without offering any resistance to the automatic mechanism operating it and keeping all the parts in predetermined fixed relation to each other, thereby securing more accurate results and materially reducing in size the operating mechanism as friction is reduced to a minimum and, in fact, practically done away with entirely.

Another object is to provide a brake mechanism mounted on and movable with the floating transmission.

My floating transmission, as hereinafter described, is designed for use either in connection with pneumatics for operating the same, or a flange device for centralizing the music sheet or in conjunction with pneumatics and a flange centralizing mechanism. In the present instance, I have chosen to show it in connection with pneumatics alone.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a top plan of my present improvements.

Fig. 2 is a front elevation with a portion of the note sheet broken away.

Fig. 3 is a back view.

Fig. 4 is an end elevation.

Fig. 5 is a view looking at the end opposite to that seen in Fig. 4.

Fig. 6 is an enlarged sectional view of the transmission mechanism, broken away.

Fig. 7 is a cross section on the line 7—7 of Fig. 6, looking in the direction of the arrows.

Fig. 8 is a vertical cross section on the line 8—8 of Fig. 6, looking in the direction of the arrows.

Like numerals of reference indicate like parts throughout the several views.

Such parts of a musical player as are not herein illustrated or described are supposed to be of the usual or any preferred form of construction and operating in the usual manner.

In the drawings, 1 designates a trackerbar, 2 a take-up spool and 3 a perforated note sheet. The trackerbar is supported in the end walls 4 of the music spool box, as shown.

5 are the spindles on which the music spool revolves; they are mounted to move freely in the end walls 4 of the box, as shown in Fig. 6, bushings 6 being provided, if desired. The openings are sufficiently large so that the spindles are at all times out of contact with the walls thereof, so as to guard against friction.

Rigid with the one spindle 5, that at the right in Fig. 6, is a shaft 7, which is mounted to revolve freely in the lower ends of the depending portions 8 and 9 of the U-shaped members soon to be described. On this shaft, between the said depending portions 8 and 9, are secured the sprocket wheel 10 and the brake wheel 11, as seen best in Fig. 6.

Rigid with the other spindle 5, as seen best in Fig. 6 at the left, is a rod 12 which, with the tubular portion of the said spindle, slides freely through a bearing in the depending portion 13 of the inner U-shaped member soon to be described, and the said rod slides freely through the depending portion 14 of the other U-shaped member, as seen clearly in Fig. 6. Around the said rod 12 is a spring 15 between the end of the tubular portion above referred to and the adjacent wall of the depending portion 14, said spring being adapted to be compressed as the spindle moves to the left in said Fig. 6.

16 are uprights having the transverse lower portions 17 which are loosely secured to the ends of the music box by any suitable means, as screws or the like 18, so as to permit of bodily movement of the uprights, which serve to support the U-shaped members soon to be described. The uprights 16 are held against displacement by pins or the like 19, see Figs. 6, 7 and 8, which form a loose connection between said uprights and the adjacent U-shaped member.

The pins 19 loosely engage in openings or sockets in the under face of the U-shaped member 20, having the depending portions 8 and 13, before described, and 21 is another U-shaped member which is rigidly secured to the U-shaped member 20, in any suitable manner so that the two move together. These U-shaped members and their connections and support constitute what I term a "floating transmission" device which is supported in such a manner as to be most perceptible to any agency that tends to give it motion to the right or to the left. As seen best in Figs. 7 and 8 the rod or shaft 7 and the tubular portion of the left hand spindle 8 move through elongated slots or openings 22 and 23 respectively in the supports 16. These openings allow free oscillatory movement of the uprights 16 in the direction of the length of the roll, yet prevent lateral movement of the spindles.

The openings 24 in the lower ends of the uprights 16 through which the screws 18 pass are somewhat larger than the screws to allow the necessary freedom of movement of the said supports. Resilient washers 25 may be provided upon these screws upon opposite sides of the uprights, if found necessary.

At any convenient place, in the present instance shown as at each end of the back of the box 4, I mount pneumatics 26 secured thereto in any suitable manner and each designed to be connected, in any suitable way, with a source of air supply, not shown. As seen best in Fig. 1, each pneumatic has attached thereto, to its movable member, an arm 27 with a substantially right angled extension 28, to the free end of which is pivotally connected one end of a rod 29, the other end of which is adjustably connected by buttons or the like 30 with an arm 31 rigidly secured to the depending portions 9 and 14 respectively, of the U-shaped member 21, see Figs. 2, 4 and 5.

In connection with the mechanism hereinbefore described, I employ, sometimes, a pneumatic brake or resisting device, the preferred form of which is shown in Figs. 1, 2 and 5. This is mounted upon and designed to move with the floating transmission mechanism, and comprises a pneumatic 32 mounted upon and adapted to move with the U-shaped member 21, while 33 is a brake member mounted upon and adapted to move with the movable member of the pneumatic 32 and to act against the periphery of the brake wheel 11 on the shaft 7, see Fig. 2, at the right. This brake member is carried by a spring arm 34, and is pivotally mounted between its ends, as at 35, on the arm 31 with which the rod 29 is connected, the said arm also being bent partially around and secured to the pneumatic 32, as seen at 36, in Fig. 1.

37 is a connection leading from the pneumatic 32 to the action chest, not shown, in a manner well known in this class of devices.

It is to be noted that the brake member 33 moves with the transmission mechanism, the brake wheel 11 also being simultaneously movable therewith. This is most desirable for by having a movable brake wheel and a stationary brake, as heretofore, the wheel wears a depression in the brake and as quite often there are note sheets inserted in the machine that require different positions of the wheel on the stationary brake, this rut or depression naturally offers resistance to the operating mechanism that shifts the parts endwise of the music box, thereby hindering the accuracy of operation of the parts. All this is avoided by mounting the brake member and the brake wheel so as to move with the transmission mechanism.

It will be observed that the two U-shaped members 20 and 21 and the parts carried thereby are, in effect, suspended, their only support being the members 16 which have loose connection at their upper ends with said members and the lower ends of which are free to move in the direction of the length of the spindles within certain limits.

The operation is simple and will be readily understood from the foregoing description when taken in connection with the annexed drawings, and, briefly stated, is as follows:—

Upon inserting a music roll 38, as seen in Fig. 2, the left-hand spindle will be slightly moved to the left, slightly compressing the spring 15, holding the roll against the right-hand spindle, which places the roll ready for operation, leaving all of the parts in a stationary relation to each other, with the exception of the two T-shaped supports 16 supporting the transmission at each end, thereby, if the transmission and music are moved to the left the tubular portion of the spindle 5 on the left and the rod or shaft of the spindle 5 on the right will move through their enlarged bearings, which, however, are such, as seen in Figs. 7 and 8, as to prevent lateral movement of the spindles. The U-shaped bars and the parts carried thereby are mounted to move with the greatest of freedom, being most sensitive in their action.

Modifications in details may be resorted to without departing from the spirit of the invention or sacrificing any of its advantages.

What is claimed as new is:—

1. In a device of the character described, an endwise movable suspended floating transmission mechanism having independent oscillatory supports mounted on horizontal pivots.

2. In a device of the character described, an endwise movable suspended floating transmission mechanism having independent oscillatory supports mounted on horizontal pivots and opposed spindles movable therewith.

3. In a device of the character described, an endwise movable suspended floating transmission mechanism having independent oscillatory supports mounted on horizontal pivots and opposed spindles movable in unison and therewith.

4. In a device of the character described, a floating endwise bodily movable oscillatorily supported transmission mechanism having independent oscillatory supports mounted on horizontal pivots.

5. In a device of the character described, a bodily endwise movable suspended oscillatorily supported transmission mechanism having oscillatory supports mounted on horizontal pivots in bearings movable independently of each other.

6. In a device of the character described, a bodily endwise movable suspended transmission mechanism having independent oscillatory supports, spindles carried thereby, and movable bearings supporting said spindles.

7. In a device of the character described, a suspended floating transmission mechanism having oscillatory supports mounted on horizontal pivots, spindles carried thereby and a box having openings through which said spindles are loosely movable out of contact with the walls thereof.

8. In a device of the character described, endwise movable spindles, oscillatory means connecting said spindles mounted on horizontal pivots to move them in unison and means for suspending the first-named means and giving the same bodily endwise movement.

9. In a device of the character described, endwise movable spindles, inverted U-shaped members mounted for endwise movement bodily, in depending portions of which said spindles are carried, said spindles being movable in unison with as well as independent of said depending portions.

10. In a device of the character described, a music spool box, spindles loosely endwise movable through the ends of said box, arched means carrying said spindles, and a vibratory support for said means.

11. In a device of the character described, suspended endwise movable spindles, an arched member carrying the same and a vibratory support for said member mounted on horizontal pivots and through which said spindles loosely move.

12. In a device of the character described, suspended endwise movable spindles, an arched member carrying the same, and a vibratory support mounted on horizontal pivots and through which said spindles loosely pass, said support having loose connection with said member.

13. In a device of the character described, suspended endwise movable spindles, a music spool box, an arched member carrying said spindles, and a movable support on the music box mounted on horizontal pivots for sustaining the weight of said member.

14. In a device of the character described, suspended endwise movable spindles, arched members having depending portions forming spaced bearings for said spindles, and a vibratory support for the arched members mounted on horizontal pivots.

15. In a device of the character described, suspended endwise movable spindles, an arched member having depending portions forming spaced bearings for said spindles, and a vibratory support for the arched member.

16. In a device of the character described, endwise movable spindles, suspended arched members rigidly united and having depending portions forming spaced bearings for said spindles, and a vibratory support for the arched members mounted on horizontal pivots.

17. In a device of the character described, an endwise bodily movable transmission mechanism and a brake mechanism movable therewith.

18. In a device of the character described, spool supporting spindles, bodily endwise movable oscillatorily mounted means connecting them to move in unison, and a brake mechanism movable with said spindles.

19. In a device of the character described, spool supporting spindles, bodily endwise movable oscillatorily mounted means connecting them to move in unison, and a brake mechanism mounted on said means.

20. In a device of the character described, spool supporting spindles, bodily endwise movable oscillatorily mounted means connecting them to move in unison, and a brake mechanism movable with said means.

21. In a device of the character described, an endwise movable transmission mechanism and a pneumatic brake mechanism mounted upon and movable therewith.

22. In a device of the character described, spool supporting spindles, bodily endwise movable oscillatorily mounted means connecting them to move in unison, and a pneumatic brake mechanism movable with said spindles.

23. In a device of the character described, oscillatorily mounted spool supporting spindles, bodily endwise movable oscillatorily mounted means connecting them to move in unison and a pneumatic brake mechanism movable with said spindles.

24. In a device of the character described, spool supporting spindles, bodily endwise movable oscillatorily mounted means connecting them to move in unison, and a pneumatic brake mechanism movable with said means.

25. In a device of the character described, movably mounted spool supporting spindles, a brake member movable with one of said spindles, means connecting said spindles to move them in unison and a brake member carried by said means and coöperating with said first-named brake member.

26. In a device of the character described, endwise movable spindles, bodily endwise movable means connecting said spindles to move them in unison and oscillatory means mounted on horizontal pivots for suspending the first-named means, and pneumatic operating means therefor.

27. In a device of the character described, a bodily endwise movable suspended transmission mechanism, oscillatory supports therefor mounted on horizontal pivots, opposed spindles movable therewith, and pneumatic means for actuating said transmission mechanism.

28. In a device of the character described, a bodily endwise movable suspended transmission mechanism, oscillatory supports therefor mounted on horizontal pivots, opposed spindles movable in unison and therewith, and pneumatic means for actuating said transmission mechanism.

29. In a device of the character described, a bodily endwise movable suspended transmission mechanism supported in oscillatory bearings mounted on horizontal pivots, and pneumatic means for actuating said transmission mechanism.

30. In a device of the character described, a bodily endwise movable suspended transmission mechanism, spindles carried thereby, oscillatory bearings mounted on horizontal pivots supporting said spindles, and pneumatic means for actuating said transmission mechanism.

31. In a device of the character described, a floating bodily endwise movable transmission mechanism mounted upon oscillatory supports mounted on horizontal pivots for freedom of movement and pneumatic means for actuating the same mounted upon the rear of a music spool box.

32. In a device of the character described, a bodily endwise movable suspended transmission mechanism mounted upon oscillatory supports mounted on horizontal pivots for freedom of movement and pneumatic means for actuating the same mounted upon the rear of a music spool box.

In testimony whereof I affix my signature.

GEORGE P. BRAND.